United States Patent [19]

Kruchell

[11] 3,995,881
[45] Dec. 7, 1976

[54] GOLF CART SEAT ASSEMBLY

[76] Inventor: George M. Kruchell, 10340 Chaucer St., Westchester, Ill. 60153

[22] Filed: Aug. 8, 1975

[21] Appl. No.: 603,049

[52] U.S. Cl. .............................. 280/646; 108/134
[51] Int. Cl.² ........................................ A63B 55/08
[58] Field of Search ............ 280/36 C, 41 C, 41 D, 280/DIG. 6, 47.19, 652, 645, 646; 297/217; 108/35, 36, 48, 134

[56] References Cited

UNITED STATES PATENTS

| | | | |
|---|---|---|---|
| 1,781,977 | 11/1930 | Cummings | 108/48 |
| 2,599,928 | 6/1952 | Lyons | 280/DIG. 6 |
| 2,957,700 | 10/1960 | Beaurline | 280/49.19 |
| 3,506,280 | 4/1970 | Coupe | 280/DIG. 6 |

Primary Examiner—Robert R. Song
Attorney, Agent, or Firm—Seymour Rothstein

[57] ABSTRACT

An improved foldable golf cart seat assembly is disclosed which includes a horizontally disposed seat frame that is attached to the main golf bag carrying frame assembly and that encircles the golf bag. A seat member is pivotably attached to the seat frame and has a foldable leg assembly that is attached to its undersurface and that may be arranged so as to support the seat member in a generally horizontal position when the seat member is in use. When not in use, the seat member may be moved to a generally vertical position and the leg assembly may be folded so that it is out of the way and adjacent to the undersurface of the seat member.

9 Claims, 6 Drawing Figures

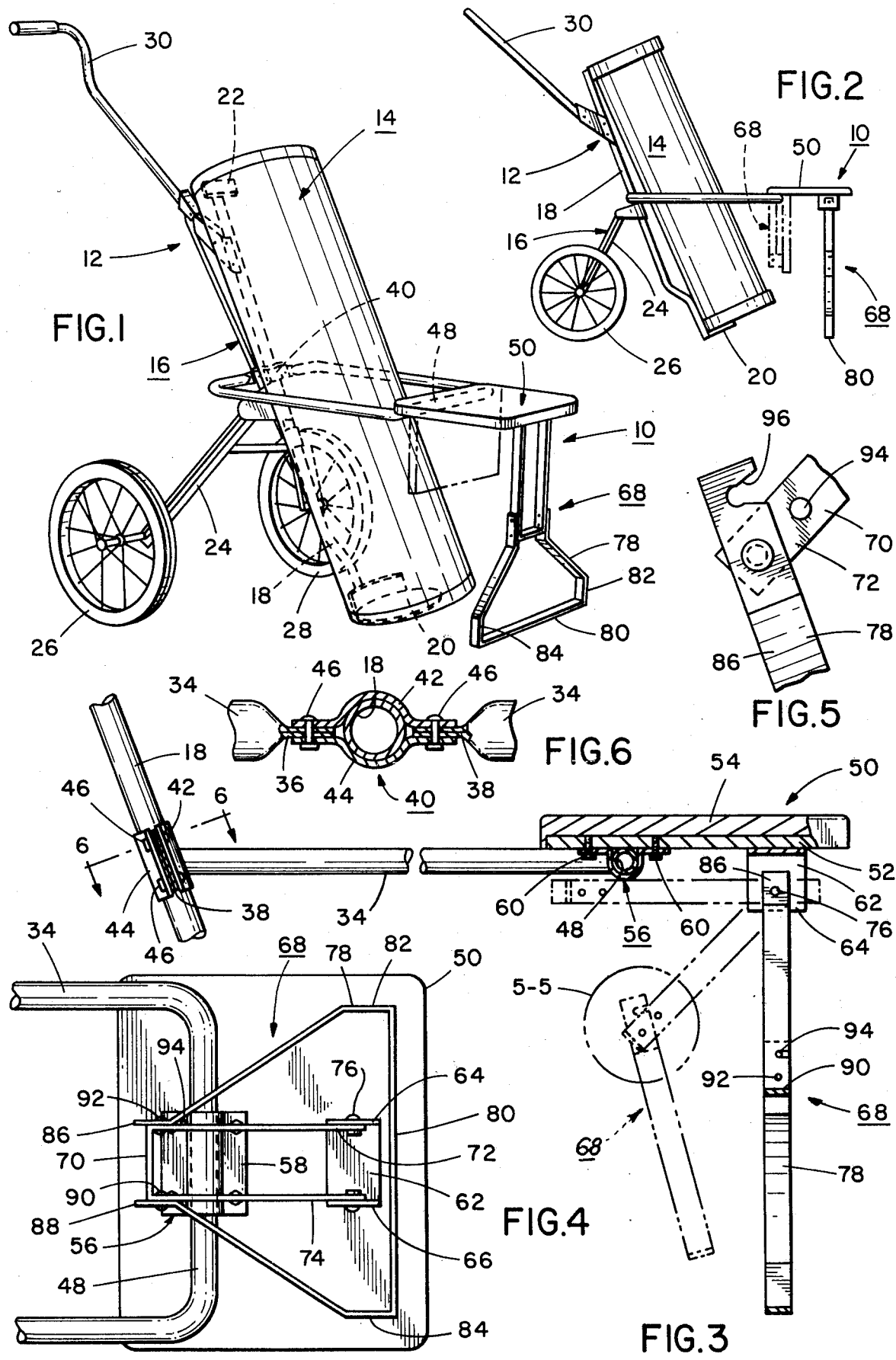

GOLF CART SEAT ASSEMBLY

BACKGROUND AND SUMMARY OF THE INVENTION

The present invention relates to accessory equipment for golfers, and more particularly, to an improved foldable seat assembly for a golf bag cart which may be readily attached to a conventional golf bag cart and which, when unfolded, affords a stable, comfortable seat.

During the last decade or so, golf has become an increasingly popular participatory sport in this and other countries. To facilitate their enjoyment of the game, more and more golfers are using golf bag carts, rather than caddies, to transport their golf bags around the golf course. Generally, golf bag carts have included a main frame assembly adapted to have one or more golf bags secured thereto and mounted on a pair of laterally spaced wheels. The upper end of the main frame assembly usually includes a handle that may be gripped by the golfer so that the golf bag cart may be either pulled or pushed by the golfer. When not being moved, most golf carts may be disposed in a generally vertically upright position wherein the wheels and the lower ends of the main frame assembly and the carried golf bag engage or are in contact with the ground.

Due to the amount of walking and exercise involved, golfers oftentimes tend to become tired while out on the course. Moreover, because of the increased popularity of golf, golfers frequently have to stand and wait between shots. Usually the golf course has no facilities, other than the ground, upon which the golfer may sit and rest during these periods of inactivity or otherwise. It has been proposed in the past to mount collapsible or foldable seats on the golf bag carts in order to provide a convenient seat for a golfer while he is out on the course and away from the clubhouse facilities. These prior proposed seats were generally characterized by having the capability of being moved from a position wherein they afford a seat to one wherein the seat is collapsed or folded and theoretically at least, does not interfere with the otherwise normal usage of the golf bag cart. These prior proposed golf cart seats have tended to employ relatively complex mechanisms to accomplish this folding and unfolding and, as a result, have been quite expensive to manufacture and assemble and have significantly increased the overall weight of the golf bag cart. Furthermore, because of the complexity of the components of the seat, the seats also tended to become quite bulky so that even when disposed in their collapsed or folded position, they have, in practice, obstructed or at least hindered normal usage of the golf bag. These disadvantages, of course, have reduced the attractiveness of the prior proposed golf cart seats to golfers.

It is a primary object of the present invention to provide an improved golf bag cart seat assembly which overcomes the aforementioned problems of the prior proposed golf bag cart seats, which incorporates relatively simple components to afford a comfortable, sturdy seat for the golfer and which may be attached to existing conventional golf bag carts without interfering with the primary purpose of the golf bag cart, i.e. the carrying or transportation of one or more golf bags. From a marketing standpoint, my improved golf bag cart seat assembly has the commercially attractive advantages of being lightweight, of permitting facile attachment to conventional golf bag carts and of being capable of being folded completely out of the way so as to afford no obstruction or hindrance, when in its folded position, to the normal usage of the golf bag cart and the carried golf bag.

More specifically, my improved golf bag cart seat assembly comprises a seat frame adapted to be quickly and easily mounted on the main frame assembly of a golf bag cart so that the seat frome is disposed in a generally horizontal plane. The seat frame includes a tubular member that encircles the golf bag being carried or transported by the cart. The portion of the tubular member remote from the point of attachment between the seat frame and the main frame assembly extends beyond the lower ends of the main frame assembly and carried golf bag and has a seat member pivotably attached thereto so that the seat member may be moved between a generally horizontal position and a generally vertical position.

A foldable leg assembly is secured to the undersurface of the seat member at a point remote from the point of attachment between the seat frame and the seat member. The leg assembly includes upper and lower leg portions which are pivotably innerconnected and which may be arranged in a first or unfolded position wherein the upper and lower leg portions are vertically aligned and wherein the lower end of the lower leg portion engages or contacts the ground adjacent to the lower ends of the main frame assembly and the carried golf bag. The leg assembly may also be readily moved to a second or folded position wherein the upper and lower leg portions are folded adjacent to each other and generally parallel with the undersurface of the seat member. The upper and lower leg portions include means for latching the leg portions in their first position and means for retaining the leg portions in their second folded position.

When the seat member is moved to its vertical position and the leg is in its folded position, the seat member is adjacent to the carried golf bag and is completely unobstructs the normal usage of the cart. The length of the leg assembly and the distance between the point of attachment between the main frame assembly and seat assembly and the ground is selected so that the seat member, when in use, is positioned at normal chair height above the ground. The comfort and stability of the seat is enhanced by the fact that the lower ground engaging end of the lower leg portion has a length which is substantially equal to the width of the seat member and is disposed so that its longitudinal axis is substantially parallel to the common axis of rotation of the cart wheels.

These and other objects, advantages and features of my present invention will become apparent from the following description of the preferred embodiment of my invention, described in connection with the accompanying drawings.

DESCRIPTION OF THE DRAWINGS

FIG. 1 is a perspective view of a golf bag cart including a seat assembly, embodying the principles of my present invention, shown in its unfolded position by full lines and in its folded position by broken lines.

FIG. 2 is a side elevational view of the golf bag cart and seat assembly of FIG. 1 showing the seat assembly in its unfolded position in full line and in its folded position by broken lines.

FIG. 3 is an enlarged side, partial cross-sectional view of the seat frame and seat member and showing the seat leg assembly in various positions relative to the seat member.

FIG. 4 is an enlarged bottom plan view of the seat member with the seat leg assembly being shown in its folded position.

FIG. 5 is an enlarged view of a portion of the seat leg assembly designated by the line 5—5 in FIG. 3.

FIG. 6 is a cross-sectional view taken along the line 6—6 in FIG. 3.

Throughout the various figures of the drawings, the same reference numerals will be used to designate the same parts. Moreover, when the terms "right," "left," "right end," "left end," "upper" and "lower" are used herein, it is to be understood that these terms have reference to the structure shown in the drawings as it would appear to a person viewing the drawings.

DESCRIPTION OF THE PREFERRED EMBODIMENT

Referring now to FIGS. 1 and 2, an improved seat assembly embodying the principles of my present invention is shown generally at 10 and is adapted to be mounted on a golf bag cart such as shown at 12. The cart 12 is adapted to carry or transport a golf bag generally shown at 14.

More specifically, the golf bag cart 12 includes a main frame assembly 16 which includes a tubular member 18 having a base plate 20 secured to its lower end and a transverse, upper plate 22 secured to its upper end. The bottom end of the golf bag 14 rests on the base plate 20 while the transverse plate 22 supports the upper end of the golf bag 14. A strap, belt or the like, not shown, may be used to secure the golf bag 14 to the main frame assembly 16. A generally V-shaped subassembly 24 has its apex end secured, as by welding or the like, to the tubular member 18 approximately midway between its ends. Wheels 26 and 28 have their axles journaled in the space apart, bifurcated ends of the sub-assembly 24 so that the wheels 26 and 28 may rotate about a common, transverse axis of rotation. A handle 30 is secured, as by welding or the like, to the tubular member 18 adjacent to its upper end and may be utilized to push or pull the cart 12 over the ground. When the cart 12 is not in use, it may be disposed in a generally vertical, upright position such as shown in FIGS. 1 and 2. The stability of the cart 12 in this upright position is assured as a result of the spaced triangular, three point ground engagement or contact by the wheels and the lower ends of the base plate 20 and golf bag 14.

A seat frame 32 is attached to the tubular member 18 adjacent to its mid-portion. The seat frame 32 includes a tubular member 34 which is formed in a generally rectangular shape and which has two flattened or pinched ends 36 and 38. The dimensions of the rectangular opening or space defined by the tubular member 34 are such that the tubular member may encircle or fit completely about the gold bag 14 and does not interfere with placing the bag 14 on or taking the bag off of the cart 12.

As best shown in FIGS. 3 and 6, a bracket, indicated generally at 40, is utilized to secure the tubular member 34 to the main frame assembly 16. The bracket 40 includes two generally rectangular plates 42 and 44. The central portions of the plates 42 and 44 are curved so that the curved portions have substantially the same general radius of curvature as that of the tubular member 18 and so that they can fit about and be tightly clamped around the tubular member 18. After the plates 42 and 44 are placed, face to face, about the tubular member 18, the ends 36 and 38 of the tubular member 34 are positioned between the adjacent lateral side portions of the facing plates. A plurality of bolts or rivets 46 are used to secure the plates 42 and 44 together about the tubular member 18 so that the ends 36 and 38 are tightly clamped between the facing plates. By the use of the bracket 40, the seat frame 32 can be mounted where desired on the tubular member 18, and the tubular member 34 may be disposed in a generally horizontal plane.

As best shown in FIGS. 1 and 3, the central portion 48 of the tubular member 34 is located opposite to the bracket 40 and has its central longitudinal axis disposed generally parallel to the common axis of rotation of the wheels 26 and 28. A seat member 50 is pivotably attached to the central portion 48 of the tubular member 34. The seat member 50 includes a generally rectangular board like member 52 having a layer of padding 54 secured to its upper and side surfaces.

A bracket 56, preferably made of metal, is secured to the undersurface of the board member 52 at a point on the longitudinal center line of the board seat member 52 and approximately midway between the transverse longitudinal center line of the seat member 52 and the left hand side edge of the seat member, as shown in FIGS. 3 and 4. The bracket 56 includes a generally rectangular plate 58 which is curved along its central longitudinal axis so as to receive and fit over the central portion 48 of the tubular member 34. The plate 58 is secured to the undersurface of the board member 52 by a plurality of screws, shown at 60. The bracket 56 clamps the seat member 50 to pivot about the longitudinal central axis of the central portion 48 between a first, generally horizontal position, such as shown by the solid lines in FIGS. 1 and 2, wherein portions of the undersurface of the board member 52 abut and rest on the tubular member 34 and a second, generally vertical position, such as shown by broken lines in FIGS. 1 and 2.

A bracket 62, preferably made of metal, is mounted on the undersurface of the board member 52 at a point on the longitudinal center line of the board member 52 and between the transverse central line of the board member and the right hand edge of the board 52. The bracket 62 includes two integral depending end flanges 64 and 66. The lower distal ends of the end flanges 64 and 66 project from the undersurfaces of the board member 52 beyond the bracket 56.

A leg assembly 68 is attached to the seat member 50 and is utilized to support the seat member in a generally horizontal position. The leg assembly 68 includes an upper generally U-shaped, leg member 70 which has its distal ends 72 and 74 pivotably attached to the end flanges 64 and 66, respectively, by bolts 76. The bolts 76 permit limited, relative rotational movement between the ends 72 and 74 and the end flanges 64 and 66. However, because of the surface to surface contact and frictional engagement between the sides of the ends 72 and 74 and the adjacent sides of the end flanges 64 and 66, a person must exert force on the member 70 in order to move the member 70 with respect to the bracket 62 particularly when the leg assembly 68 is folded so as to be adjacent and substantially parallel to the undersurface of board member 52.

The leg assembly 68 also includes a lower generally triangular shaped, leg member 78 having an elongated grounded engaging foot portion 80. The length of the foot portion 80 is substantially equal to the width of the seat member 50. The member 78 includes two end portions 82 and 84 which are integral with the foot portion 80. The distal ends 86 and 88 of the end portions 82 and 84 are spaced from one another and are substantially perpendicular to the foot portion 80. The distal ends 86 and 88 are pivotably attached to the sides of the closed end 90 by the U-shaped member 70 by means of bolts 92. The bolts 92 permit limited relative rotational movement between the lower closed end 90 and the ends 86 and 88. However, like the ends 72 and 74 and the end flanges 64 and 66, force must be exerted on the closed end 90 and the ends 86 and 88 in order to cause this limited relative, rotational movement because of the surface to surface contact and frictional engagement between the sides of the closed end 90 and the adjacent sides of the ends 86 and 88, particularly when the leg assembly 68 is folded so as to be adjacent and substantially parallel to the undersurface of the board member.

Pins 94 are formed on the outer facing side surfaces of each of the ends 72 and 74 of the U-shaped member 70 adjacent to the closed end 90 of the member 70. These pins 94 project out from these outer facing side surfaces and are adapted to cooperate with recesses 96 formed in the distal ends 86 and 88 of the end portions 82 and 84 of the leg member 78 such that when the leg members 70 and 78 are aligned, the pins 94 are disposed within the recesses 96. The relative dimensions of the pins 94 and recesses 96 are selected so that force must be exerted in order to move the pins 94 into or out of the recesses 96. This cooperation or "snap fit" between the pins 94 and recesses 96 serves to retain the leg members 70 and 78 in their aligned position, as shown by full lines in FIG. 3.

The ground engaging foot portion 80 of the leg member 78 has, as noted above, a length which is substantially equal to the width of the seat member 50 and is disposed so that its central longitudinal axis is parallel to the transverse central line of the seat member 50 and to the common axis of rotation of the wheels 26 and 28. The use of the foot portion 80 stabilizes the seat and prevents the seat from tending to "roll" in a side fashion. The length of the leg assembly 68, as measured from the undersurface of the board member 52 to the ground, is the same as the distance between the bracket 40 and the ground when the cart 12 is on level ground. These distances are selected so that the upper surface of the seat member 50 is at the normal chair height, and this, of course, enhances the comfort of the seat.

When the seat is in use, the leg assembly 68 is moved by the exertion of force, to a position wherein the leg members 70 and 78 are aligned and are disposed in a plane substantially perpendicular to the plane of the seat member 50 so that the foot portion 80 of the leg member 78 may contact or engage the ground beneath the seat member 58. The cooperation or "snap fit" between the pins 94 and recesses 96 serve to retain the leg assembly 68 in this aligned, unfolded position. However, when the seat member 50 is not in use, the leg assembly 68 may be folded so that the leg members 70 and 78 are disposed, side by side, and in the same plane. Moreover by forcefully rotating the folded leg assembly 68 with respect to the depending flanges 64 and 66 of the bracket 62 the folded leg assembly may be disposed in a plane parallel to the seat member 50 and adjacent to the undersurface of the seat of the board member 52. The surface to surface contact between the sides of the ends 72 and 74 and the end flanges 64 and 66 and between the closed end 90 and the ends 86 and 88 serves to hold or retain the leg assembly 68 in its folded position. The seat member 50 may, in turn, be pivoted about the central portion 48 of the tubular member 34 until it is vertically disposed. When the leg assembly 68 is folded and the seat is moved to its substantially vertical position, the seat assembly 10 offers no hinderance or obstruction to the normal usage of the cart 12.

In conclusion, it should be apparent to those having skill in this art that my improved seat assembly 10, described hereinabove, affords commercially significant advantages over the prior proposed golf cart seats. The structure and design of my seat assembly 10 is quite simple and therefore can be manufactured relatively inexpensively. Moreover, my improved seat assembly 10 can be quickly and easily mounted on the cart 12 with a minimum of time and effort. Because of its simplicity, my seat assembly 10 is relatively lightweight and does not offer any obstruction or hinderance to the normal usage of the cart 12.

It should also be apparent to those having skill in this art that the modifications and changes can be made in the above described embodiment of my improved seat assembly 10. Thus, since my invention, as disclosed herein, may be embodied in other specific forms without departing from the central characteristics thereof, the preferred embodiment described herein is therefore to be considered in all respects as illustrative and not restrictive, the scope of my invention being indicated by the appended claims, rather than by the foregoing description, and all changes which come within the meaning and range of equivalency of the claims are therefore intended to be embraced herein.

I claim:

1. An improved foldable seat assembly for a golf bag cart that includes a pair of laterally spaced, ground engaging wheels mounted for rotation about a common axis of rotation, and a main frame assembly that is mounted on the wheels and that is adapted to carry a golf bag in a generally vertical disposition between the cart wheels, with the lower ends of the main frame assembly and the carried golf bag being adapted to engage the ground, at a point spaced in one direction, from a vertical plane including the common axis of rotation of the wheels so that when the golf bag cart is not in use, the golf bag cart may be supported in a stable, generally upright position as a result of the ground engagement of the two wheels and the lower ends of the main frame assembly and the carried golf bag, the improved seat comprising:
 a seat frame attached to the main frame assembly at a preselected point adjacent to one side portion of the carried golf bag and generally projected from the main frame assembly in said one direction and so as to extend about the carried golf bag, with the seat frame means having a first position disposed adjacent to a second side portion of the carried golf bag that is opposite to the one side portion of the carried golf bag and with the seat frame being attached to the main frame assembly so that the seat frame is disposed in a generally horizontal plane when the golf bag cart is supported in its stable, generally upright position;

a generally flat seat member attached to the firt portion of the seat frame and being selectively movable between a generally horizontal position and a generally vertical position;

means for supporting the seat member having an upper leg portion and a lower leg portion, with one end of the upper leg portion being attached to the seat member at a point spaced from the point of attachment between the seat member and the first portion of the seat frame and being selectively movable between a first position wherein the upper leg portion is substantially perpendicular to the plane of the seat member and a second position wherein the upper leg portion is substantially parallel to the plane of the seat member; with one end of the lower leg portion being adapted to engage the ground, and with the other end of the upper leg portion being attached to the other end of the lower portion such that the lower leg portion may move, with respect to the upper leg portion, from an unfolded position wherein the upper and lower leg portions are aligned and define a straight leg having a length substantially equal to the distance between the preselected point of attachment between the main frame assembly and the seat frame and the ground and a folded position wherein the lower leg portion is disposed adjacent to upper leg portion;

means for latching the upper and lower leg portions in their unfolded position;

first means for retaining the upper and lower leg portions in their folded position;

second means for retaining the upper leg portion in its second position;

said lower leg portion including a transverse, ground engaging member having upwardly extending leg members formed at each end thereof;

a pair of spaced, depending flanges being secured to the undersurface of the seat member;

said upper leg portion including a generally U-shaped member whose ends are pivotably attached to the pair of flanges; and the distal ends of the leg members of the lower leg portion being pivotably attached to the closed end of the U-shaped member.

2. The improved foldable seat assembly described in claim 1 wherein the seat frame encircles the golf bag carried by the golf bag cart and wherein the first portion of the seat frame is centrally located between the ends of the seat frame.

3. The improved foldable seat assembly described in claim 1 wherein the seat member is pivotably attached to the first portion of the seat frame; and wherein the seat member extends, in said one direction, beyond the lower ends of the main frame assembly and the carried golf bag.

4. The improved foldable seat assembly described in claim 1 wherein the longitudinal axis of the ground engaging member of the lower leg portion extends parallel to the common axis of rotation of the wheels and had a length substantially equal to the width of the seat member.

5. The improved foldable seat assembly described in claim 1 wherein the first retaining means comprises the frictional engagement between the sides of the distal ends of the leg members and the adjacent sides of the U-shaped member; and wherein the second retaining means comprises the frictional engagement between the sides of the pair of depending flanges and the adjacent sides of the ends of the U-shaped member.

6. The improved foldable seat assembly described in claim 1 wherein the latching means includes at least one pin projecting from the side of the U-shaped member or from one of the distal ends of the leg members and at least one recess which is formed in one of the distal ends of the leg members or in the U-shaped member and which is arranged to receive the pin when the upper and lower leg portions are moved to their unfolded position.

7. The improved foldable seat assembly described in claim 6 wherein the first retaining means comprises the frictional engagement between the sides of the distal ends of the leg members and the adjacent sides of the U-shaped member; and wherein the second retaining means comprises the frictional engagement between the sides of the pair of depending flanges and the adjacent sides of the ends of the U-shaped member.

8. The improved foldable seat assembly described in claim 7 wherein the longitudinal axis of the ground engaging member of the lower leg portion extends parallel to the common axis of rotation of the wheels and has a length substantially equal to the width of the seat member.

9. The improved folded seat assembly described in claim 8 wherein the seat frame encircles the golf bag carried by the golf bag cart; wherein the first portion of the seat frame is centrally located between the ends of the seat frame; wherein the seat member is pivotably attached to the central, first portion of the seat frame; and wherein the seat member extends in the one direction beyond the lower ends of the main frame assembly and the carried golf bag.

* * * * *